United States Patent
Blachman et al.

(10) Patent No.: US 12,032,647 B2
(45) Date of Patent: Jul. 9, 2024

(54) TENANT NETWORK FOR REWRITING OF CODE INCLUDED IN A WEB PAGE

(71) Applicant: Microsoft Technology Licensing, LLC, Redmond, WA (US)

(72) Inventors: Meir Baruch Blachman, Beer Sheva (IL); Itamar Azulay, Mishmar Ayyalon (IL); Nitzan Frogel, Tel Aviv (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/838,789

(22) Filed: Jun. 13, 2022

(65) Prior Publication Data
US 2023/0401275 A1    Dec. 14, 2023

(51) Int. Cl.
G06F 17/00 (2019.01)
G06F 8/74 (2018.01)
G06F 16/958 (2019.01)
G06F 40/154 (2020.01)

(52) U.S. Cl.
CPC ........... G06F 16/958 (2019.01); G06F 8/74 (2013.01); G06F 40/154 (2020.01)

(58) Field of Classification Search
CPC ........ G06F 16/958; G06F 40/154; G06F 8/74; G06F 9/45529; G06F 16/95; G06F 16/986
USPC .................................................. 715/234, 208
See application file for complete search history.

(56) References Cited

U.S. PATENT DOCUMENTS

| | | | | |
|---|---|---|---|---|
| 7,054,935 B2* | 5/2006 | Farber | ............... | H04L 67/564 709/219 |
| 7,840,707 B2* | 11/2010 | Jerrard-Dunne | ...... | H04L 67/567 709/246 |
| 7,873,707 B1* | 1/2011 | Subramanian | ...... | G06F 16/9566 709/219 |
| 9,460,222 B2* | 10/2016 | Gutkin | ............... | G06F 16/9566 |

(Continued)

FOREIGN PATENT DOCUMENTS

CN    108683613 B    5/2022

OTHER PUBLICATIONS

Durieux et al., Fully Automated HTML and Javascript Rewriting for Constructing a Self-healing Web Proxy, Published Mar. 23, 2018 via arXiv, pp. 1-12 (pdf).*

(Continued)

*Primary Examiner* — Manglesh M Patel
(74) *Attorney, Agent, or Firm* — Weaver IP L.L.C.

(57) ABSTRACT

A tenant network of a cloud services platform performs the rewriting of code included in a web page. For example, a proxy service communicatively coupled to a plurality of browser applications belonging to the same tenant network and a server receives a request, from a first browser, for a web page hosted by the server. The web page is returned to the proxy service, and the proxy service identifies code component(s) thereof for rewriting. The proxy service provides the identified code component(s) to a second browser included in the same tenant network as the first browser that is configured to rewrite the code component(s). After rewriting the code component, the second browser provides the rewritten code component(s) to the proxy service, which forwards the web page, along with the rewritten code component(s), to the first browser for execution and rendering.

19 Claims, 7 Drawing Sheets

(56) References Cited

U.S. PATENT DOCUMENTS

| | | | | |
|---|---|---|---|---|
| 9,549,038 | B1* | 1/2017 | Anne | G06F 16/95 |
| 10,387,521 | B2* | 8/2019 | Steiner | H04L 67/02 |
| 10,860,351 | B1* | 12/2020 | Lewin | G06F 9/45529 |
| 11,501,258 | B1* | 11/2022 | Thornton, II | H04L 67/02 |
| 2002/0129064 | A1* | 9/2002 | Guthrie | H04L 67/53 |
| | | | | 715/234 |
| 2004/0044768 | A1* | 3/2004 | Takahashi | H04L 67/565 |
| | | | | 709/225 |
| 2006/0041637 | A1* | 2/2006 | Jerrard-Dunne | H04L 67/567 |
| | | | | 709/219 |
| 2006/0041834 | A1* | 2/2006 | Chen | G06F 16/986 |
| | | | | 707/E17.118 |
| 2006/0253411 | A1* | 11/2006 | Roy-Chowdhury | |
| | | | | G06F 16/958 |
| 2009/0106349 | A1* | 4/2009 | Harris | H04L 67/568 |
| | | | | 709/203 |
| 2011/0302323 | A1* | 12/2011 | Fisk | G06F 16/951 |
| | | | | 709/246 |
| 2012/0331175 | A1* | 12/2012 | Ito | H04L 67/56 |
| | | | | 709/246 |
| 2013/0091417 | A1* | 4/2013 | Cordasco | G06F 16/972 |
| | | | | 715/234 |
| 2013/0174021 | A1* | 7/2013 | Buchwald | G06F 40/154 |
| | | | | 715/235 |
| 2013/0311863 | A1* | 11/2013 | Gutkin | G06F 16/9566 |
| | | | | 715/208 |
| 2014/0129920 | A1* | 5/2014 | Sheretov | H04L 63/20 |
| | | | | 715/234 |
| 2014/0280867 | A1* | 9/2014 | Burch | G06F 16/958 |
| | | | | 709/224 |
| 2015/0317405 | A1* | 11/2015 | Manchester | G06F 16/958 |
| | | | | 715/234 |
| 2017/0318104 | A1* | 11/2017 | Angeles | G06F 16/986 |
| 2018/0013848 | A1* | 1/2018 | Schejter | H04L 67/02 |
| 2019/0222662 | A1* | 7/2019 | Schejter | G06F 16/9566 |
| 2020/0374281 | A1* | 11/2020 | Zeng | G06F 9/45529 |
| 2020/0374740 | A1 | 11/2020 | So et al. | |
| 2021/0109992 | A1* | 4/2021 | Rappaport | H04L 63/0281 |
| 2021/0314302 | A1* | 10/2021 | Lewin | H04L 63/0281 |

OTHER PUBLICATIONS

"Application as Filed in U.S. Appl. No. 17/730,776", filed Apr. 27, 2022, 46 Pages.

"International Search Report and Written Opinion Issued in PCT Application No. PCT/US23/022184", dated Sep. 11, 2023, 9 Pages.

* cited by examiner

TENANT NETWORK FOR REWRITING OF CODE INCLUDED IN A WEB PAGE

BACKGROUND

A cloud access security broker (CASB) is a web proxy that sits between a web server executing on a server computing device and a web browser executing on a client computing device to monitor interactions between the two sides and enforce security policies during these interactions. For example, the web proxy may intercept resource requests originating from a web browser and, based on a series of access control protocols, manage what a user of the web browser can access and interact with in regard to a particular set of resources. Furthermore, the web proxy can collect important information about user traffic within a computing ecosystem, which can provide valuable insights for detecting, diagnosing, and remedying possible security breaches.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to utilizing a tenant network of a cloud services platform to perform the rewriting of code included in a web page. For example, a proxy service communicatively coupled to a plurality of client browser applications belonging to the same tenant network and a server computing device receives a request, from a first client browser application, for a web page hosted by the server computing device. The web page is returned to the proxy service, and the proxy service identifies one or more code components thereof for rewriting. The proxy service provides the identified code component(s) to a second client browser application included in the same tenant network as the first client browser application that is configured to rewrite the code component(s). After rewriting the code component(s), the second client browser application provides the rewritten code component(s) to the proxy service, which forwards the web page, along with the rewritten code component(s), to the first client browser application for execution and rendering.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
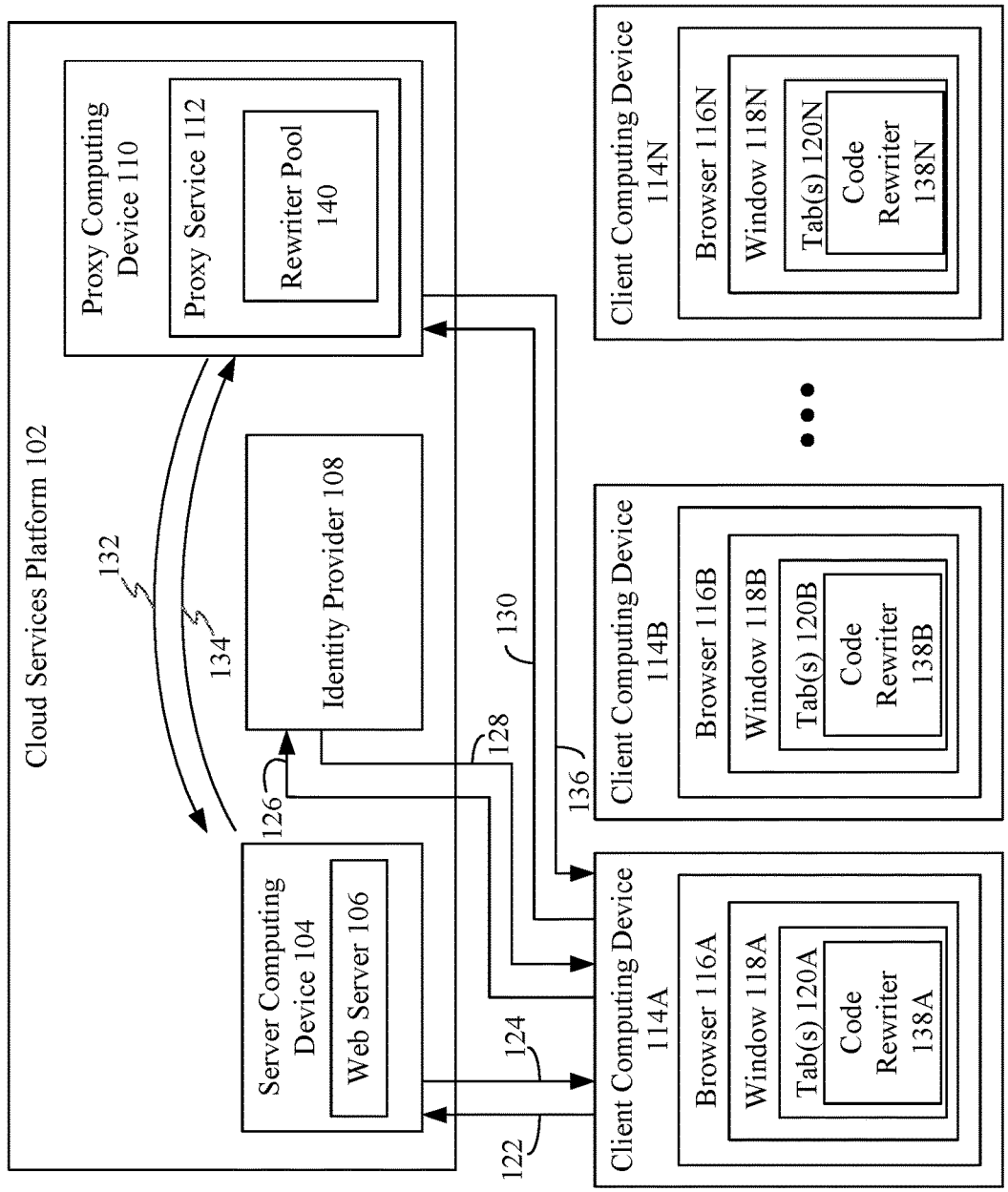
FIG. 1 is a block diagram of an example system for initializing tabs of a browser application for modifying a code component in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Utilizing a Tenant Network for Rewriting of Code Included in a Web Page A conventional web proxy may be configured to modify code (e.g., JavaScript code) included in a web page that it receives from a web server before it passes the web page to a web browser executing on a client computing device. The conventional solution involves the web proxy parsing the code included in the web page, identifying code of interest, and rewriting the code of interest included in the web page before sending the web page to the client computing device. The parsing, identifying, and rewriting of code included in the web page is a resource-intensive task that may consume a significant amount of time and compute resources, particularly when the size of the code is large. This can adversely impact the ability of the CASB to quickly deliver web pages. As a CASB service expands to more and more users, this task can become a significant bottleneck for the CASB. However, implementing mitigating solutions at the CASB to address the bottleneck (e.g., caches, cache distribution, load balancing) would require still additional resources and may not fully address the problem.

Embodiments described herein are directed to utilizing a tenant network of a cloud services platform to perform the rewriting of code included in a web page. For example, a proxy service executing on a proxy computing device communicatively coupled to a plurality of client browser applications belonging to the same tenant network and a server computing device receives a request, from a first client browser application, for a web page hosted by the server computing device. The web page is returned to the proxy service, and the proxy service identifies one or more code components thereof for rewriting. The proxy service provides the identified code component(s) to a second client browser application included in the same tenant network as the first client browser application that is configured to rewrite the code component(s). After rewriting the code component(s), the second client browser application provides the rewritten code component(s) to the proxy service, which forwards the web page, along with the rewritten code component(s), to the first client browser application for execution and rendering.

In accordance with the embodiments described herein, the rewriting of identified code component(s) is performed by a browser application other than the browser application that initiated the request for the web page rather than by the proxy computing device. Consequently, this approach represents an improvement over a conventional approach in which a CASB web proxy must rewrite the code of interest included in a web page, which as noted above can adversely impact the performance of a CASB. Accordingly, the embodiments described herein enable the computational burden of rewriting the code to be distributed among browser applications that are part of the same tenant network, rather than solely burdening the proxy service. Accordingly, the functioning of proxy computing device on which the proxy service executes is improved, as the compute resources thereof (e.g., processing cycles, memory, storage, power, etc.) are conserved.

In accordance with the foregoing techniques, the amount of browser applications of a given tenant network available for code rewriting advantageously increases as each tab of such browser applications is opened and registered with the proxy service for code rewriting. Accordingly, the techniques described herein advantageously provide a code rewriting solution that can be both limitlessly scaled and performed in a serverless fashion, as the code rewriting can be performed on any browser application that is part of the tenant network, rather than being performed on the proxy computing device.

To help illustrate the aforementioned systems and methods, FIG. 1 will now be described. In particular, FIG. 1 is a block diagram of an example system 100 for initializing tabs of a browser application for modifying a code component in accordance with an example embodiment. As shown in FIG. 1, system 100 includes a cloud services platform 102 and a plurality of client computing devices 114A-114N. As further shown in FIG. 1, cloud services platform 102 includes a server computing device 104, an identity provider 108, and a proxy computing device 110. Server computing device 104 is configured to execute a web server 106, proxy computing device 110 is configured to execute a proxy service 112, and each of client computing devices 114A-114N is configured to execute an instance of a browser application ("browser") 116A-116N respectively. In accordance with at least one embodiment, cloud services platform 102 comprises part of the Microsoft® Azure® cloud computing platform, owned by Microsoft Corporation of Redmond, Washington, although this is only an example and not intended to be limiting.

In FIG. 1, web server 106 implements an application or service (e.g., a web application or web service) that is capable of serving resources to clients such as client computing device(s) 114A-114N, wherein such resources include web pages (or one or more components thereof utilized to render web pages, such as, but not limited to, cascading style sheets (CSS), Flash, Java applets, JavaScript, hypertext markup language (HTML), dynamic HTML (DHTML), etc.). Although web server 106 is shown as being implemented on a single server computing device 104, in alternate embodiments web server 106 may be implemented on multiple server computing devices and/or one or more other computing devices. Examples of applications or services include, but are not limited to, Web email applications (e.g., Gmail®, published by Google Inc. of Mountain View, California.), Outlook.com™, published by Microsoft Corp. of Redmond, Washington), etc., file sharing applications (e.g., Dropbox®, published by Dropbox, Inc. of San Francisco, California, Microsoft SharePoint™, published by Microsoft Corp., etc.), productivity applications (e.g., Office 365®, published by Microsoft Corp, Google Apps™, published by Google, Inc., etc.), etc.

Identity provider 108 is a computer-implemented system that is configured to create, maintain, and manage identity information associated with users while providing authentication services to reliant web services. Identity provider 108 may be implemented, for example, on one or more server computing devices.

Proxy service 112 is a computer-implemented system that is configured to monitor and manage interactions between the application or service implemented by web server 106 and users thereof. Although proxy service 112 is shown as being implemented on a single proxy computing device 110, in alternate embodiments proxy service 112 may be implemented on multiple proxy computing devices and/or one or more other computing devices.

Each component of cloud services platform 102 and client computing devices 114A-114N may be communicatively connected via one or more networks (not pictured in FIG. 1). The network(s) may include, for example and without limitation, one or more of a local area network (LAN), a wide area network (WAN), a personal area network (PAN), a private network, a public network, a packet network, a circuit-switched network, a wired network and/or a wireless network.

Each of client computing devices 114A-114N may be any type of computing device, including a stationary or mobile computing device. Examples of a stationary computing device include but are not limited to a desktop computer, a personal computer (PC), a video game console, or a smart appliance (e.g., a smart television). Examples of a mobile computing device include but are not limited to a smart phone, a laptop computer, a notebook computer, a tablet computer, a netbook, or a wearable computing device (e.g., a smart watch, a head-mounted device including smart glasses such as Microsoft® HoloLens™, Google® Glass™, etc.).

Cloud services platform 102 is configured to support multi-tenancy, where cloud platform-based resources (e.g., identity provider 108, proxy computing device 110, proxy service 112, server computing device 104, and/or web server 106 services multiple tenants, with each tenant including one or more users (e.g., belonging to the same organization) who share common access to resources of the cloud services platform 102. In the example shown in FIG. 1, each of client computing devices 114A-114N are associated with (i.e., are part of) the same tenant network.

As depicted in FIG. 1, each instance of browsers 116A-116N of client computing devices 114A-114N may have a respective open browser window 118A-118N, each of which having one or more respective open tabs 120A-120N. A user of a respective client computing device of client computing devices 114A-114N may utilize any of respective tab(s) 120A-120N opened therefor to submit a request to web server 106 of server computing device 104 that requests a resource thereof. In the example shown in FIG. 1, a request 122 for a resource is transmitted from a tab of tab(s) 120A of browser 116A of client computing device 114A. It is noted that a request may be generated from any of tab(s) 120A-120N opened on any of browsers 116A-116N executing on any of client computing devices 114A-114N.

In response to receiving request 122, web server 106 may determine that the user has not yet been authenticated and may therefore provide a response 124 to browser 116A that causes browser 116A to send a request 126 to identity provider 108 for user authentication. For instance, web server 106 may redirect browser 116A to identity provider 108 in response to determining that a required authentication artifact (e.g., a token) was not provided with request 122.

After receiving request 126, identity provider 108 may determine based on an access policy whether browser 116A should access the resource via proxy service 112. An access policy may outline which users or groups of users' and what web services' network cloud traffic should be routed to proxy service 112 for monitoring and/or management. In embodiments, an information technology (IT) administrator for an organization may set access policies for applications and users of client computing devices that access a computer network of the organization. For example, identity provider 108 may evaluate a user's credentials (e.g., username and password) and determine that there is a policy associated with that user that indicates that the user should access the resource via proxy service 112.

Identity provider 108 may further authenticate the user associated with request 126 and create an authentication artifact (e.g., a token) that can be used by web server 106 to determine whether the user should be granted access to the resource. The authentication artifact may comprise a tenant identifier that identifies the tenant (or tenant network) in which the user was authenticated. In some embodiments, during authentication, a user may be prompted by identity provider 108 to provide his or her user login credentials. After determining that browser application 116 executing on client computing device 114A should access the resource via proxy service 112, identity provider 108 may send a response 128 to web browser 116 that includes an encrypted version of the authentication artifact and that redirects browser 116 to send a request 130 to proxy service 112 that includes the encrypted authentication artifact. An example of identity provider 108 includes, but is not limited to, the Microsoft® Identity Platform published by Microsoft® Corp.

To transmit request 130 to proxy service 112, the tab of tab(s) 120A from which request 130 is transmitted (i.e., the tab in which the user attempted to navigate to web server 106) first establishes a transport layer connection with proxy computing device 110 and transmits request message 130 to proxy computing device 110 via the established connection. In accordance with an embodiment, the transport layer is in accordance with a transmission control protocol (TCP) although the embodiments described herein are not so limited. In accordance with such an embodiment, each of tab of tab(s) 120A-120N of browsers 116A-116N executing on any of client computing devices 114A-114N via which a respective user attempts to navigate to web server 106 establishes such a connection with proxy computing device 110 after the respective user has been authenticated with identity provider 108.

For example, for each of tab of tab(s) 120A-120N of browsers 116A-116N executing on any of client computing devices 114A-114N that has established a connection with proxy computing device 110, proxy service 112 registers the tab as a worker that can be utilized for code rewriting for a web page served by web server 106. For instance, proxy service 112 may maintain a data structure (shown as rewriter pool 140), which stores an identifier of each tab of tab(s) 120A-120N of any of client computing devices 114A-114N for which a connection is established with proxy computing device 110. Examples of rewriter pool 140 include, but are not limited to, a table, a list, a queue, etc. When a connection is closed between a tab of tab(s) 120A-120N and proxy computing device 110, proxy service 112 removes the identifier of that tab from rewriter pool 140. A connection between a tab of tab(s) 120A-120N may be closed when that tab is closed or navigates to another web page not hosted by web server 106.

After receiving redirected request 130, proxy service 112 generates a corresponding request 132 that includes the decrypted authentication artifact and provides it to web server 106. Web server 106 may grant or deny access to the resource based on the authentication artifact. If access is granted, web server 106 may interpret request 132, generate a response 134 to request 132, and issue response 134 to proxy service 112. In some embodiments, response 134 may include a file stored on web server 106 or an output from a program executing on web server 106. In other embodiments, response 134 may include an error message if the request could not be fulfilled.

After receiving response 134, proxy service 112 may generate a response 136 (e.g., a response that includes a web page (and/or resources thereof (e.g., HTML, CSS, JavaScript, etc.)) and send response 136 to the tab of tab(s) 120A from which request 130 was initiated. In response to receiving response 136, the tab of tab(s) 120A may interpret response 136 and display (e.g., render) contents (e.g., HTML) of response 134 (e.g., when response 136 includes a web page) in the tab of tab(s) 120A for the user of client computing device 114A. Any further requests related to accessing resource of web server 106 and originating from the tab of tab(s) 120A during the user's proxy session may be directed to proxy service 112, and any responses generated by proxy service 112 to the further requests may be issued to the tab of tab(s) 120A by proxy service 112 on behalf of web server 106.

Response 136 may also comprise code (e.g., JavaScript) that, when executed by the tab of tab(s) 120A that initiated request 130, initializes a code rewriter 138A that executes within the tab of tab(s) 120. Such code may be maintained by proxy service 112 (and not web server 106). As shown in FIG. 1, one or more of tab(s) 120A of client computing device 114A, one or more tabs 120B of client computing device 114B, and one or more tabs 120N of client computing device 114N each have a respective code rewriter 138A-138N initialized therefor. Accordingly, one or more of tab(s) 120A of client computing device 114A, one or more of tabs 120B of client computing device 114B, and one or more of tabs 120N of client computing device 114N have established a connection with proxy computing device 110. Each of client computing devices 114B-114N may establish a connection with proxy computing device 110 in a similar manner as described above with respect to client computing device 114A. The requests and responses for establishing a connection between client computing devices 114B-114N and proxy computing device 110 are not shown for the sake of brevity.

As will be described below, each of code rewriters 138A-138N are configured to modify (e.g., rewrite) code components served by web server 106 such that they are in accordance with an access policy associated with proxy service 112.

In some embodiments, proxy service 112 may be configured to act as a suffix proxy. Suffix proxies enable a user to access content via a proxy server by appending the name of the proxy server to a domain URL of the requested content. For example, if a web page identifies a content source using the domain URL "targetapplication.com", proxy service 112 may rename the domain URL such that it instead appears as domain URL "targetapplication.com.proxyserver".

Figure 2:
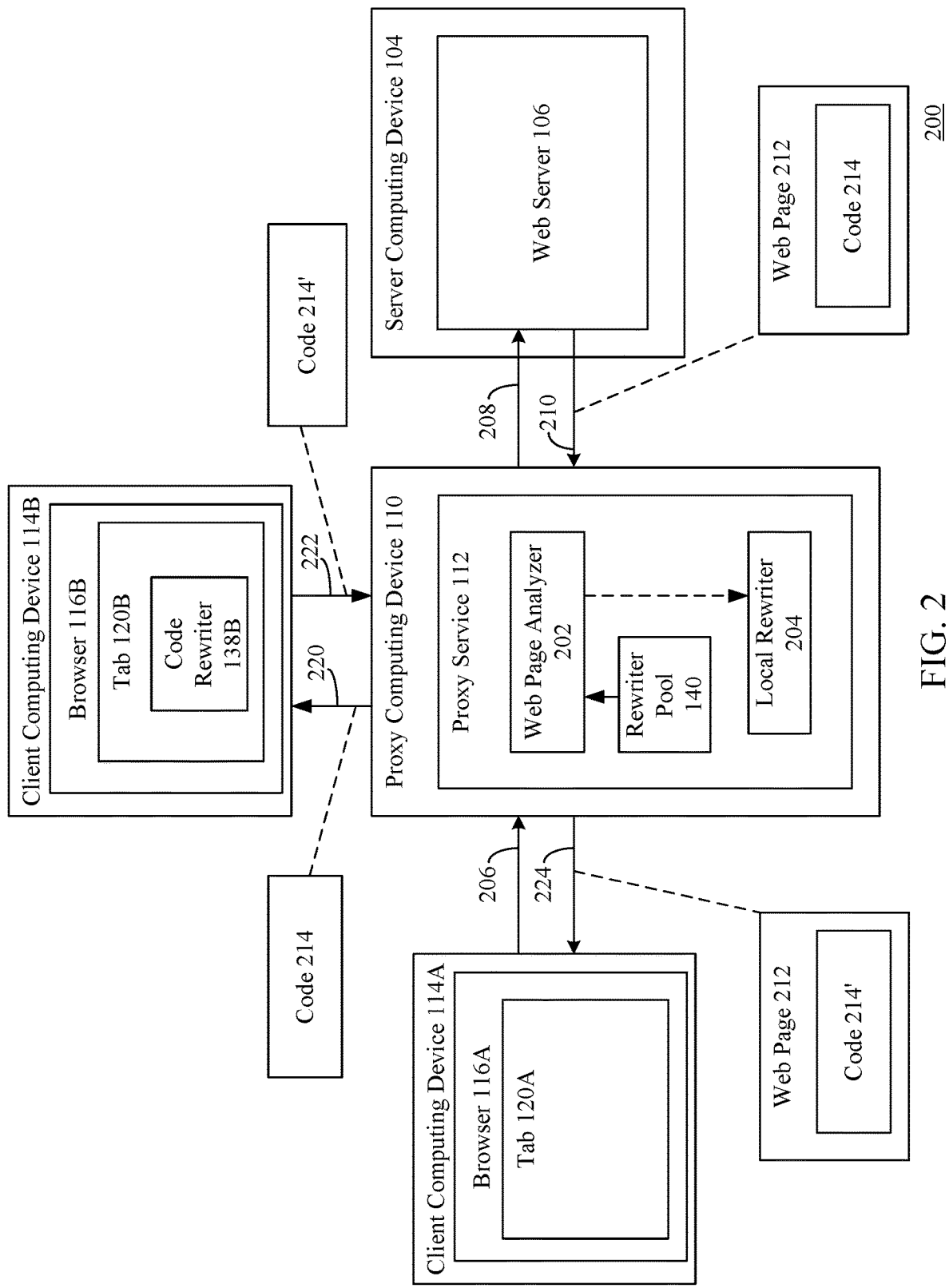
FIG. 2 is a block diagram of an example system for modifying a code component by a client computing device that is to be executed by another client computing device in accordance with an embodiment.

To help further illustrate the features of proxy service 112 in accordance with embodiments, FIG. 2 will now be described. In particular, FIG. 2 is a block diagram of an example system 200 for modifying a code component by a client computing device that is to be executed by another client computing device in accordance with an example embodiment. As shown in FIG. 2, system 200 includes client computing device 114A, client computing device 114B, proxy computing device 110, and server computing device 104, as described above with respect to FIG. 1. As further shown in FIG. 2, proxy computing device 110 includes proxy service 112, as described in FIG. 1. Proxy service 112 may comprise a web page analyzer 202, rewriter pool 140 (as described above with reference to FIG. 1, and a local rewriter 204.

As discussed above in reference to FIG. 1, proxy computing device 110 is communicatively coupled between client computing devices 114A and 114B and server computing device 104 via one or more networks (not pictured in FIG. 2). Proxy computing device 110 may establish itself as an intermediary for client computing devices 114A and 114B and server computing device 104 in accordance with the embodiments described above in reference to FIG. 1.

Proxy service 112 may be configured to manage messages (e.g., requests and/or responses) sent between browsers 116A-116B and web server 106. For example, proxy service 112 may receive a request 206 for an application or service hosted via web server 106 from tab 120A of web browser 116A. In an embodiment, proxy service 112 may receive request 206 responsive to an identity provider (e.g., identity provider 108) having determined based on an access policy that request 206 should be redirected to proxy service 112. For example, the identity provider may identify an access policy associated with a user of client computing device 114A and/or a policy associated with an application or service that the user is trying to access that indicates that interactions between the user and the application or service should be conducted via proxy service 112. As such, any requests sent from tab 120A to web server 106 will be redirected to proxy service 112 during the user's active proxy session.

Web page analyzer 202 of proxy service 112 may be configured to determine a code rewriter that executes on a different computing device than the computing device from which request 206 originates to rewrite one or more code portions of a web page served by web server 106 before that web page is provided to the originating computing device. For example, responsive to receive request 206 from tab 120A of client computing device 114A, proxy service 112 may issue a corresponding request 208 to web server 106, requesting that web server 106 fulfill request 206. Proxy service 112 then receives a response 210 corresponding to request 208 from web server 106 that includes a web page 212.

After receiving response 210 including web page 212, web page analyzer 202 analyze response 210 to determine whether the web page is a publicly-accessible web page. For instance, web page analyzer 202 may analyze the header of response 210 to determine whether a cache control field thereof comprises a directive that specifies that the web page is a publicly-accessible web page (e.g., "Cache-Control: public"). In response to determining that the header of response 210 comprises such a directive, web page analyzer 202 determines a code rewriter (e.g., code rewriter 138B) executing on a different computing device than the computing device from which request 206 originated to perform the code rewriting. In response to determining that the header of response 210 does not comprise such a directive (e.g., the cache control field comprises a directive that specifies that the web page is privately-accessible (e.g. "Cache-Control: private"), the proxy service 112 may cause local rewriter 204 to perform the code rewriting, thereby ensuring that the resource attempted to be access by a user of client computing device 114A is not provided to another computing device.

In response to determining that the web page is publicly accessible, web page analyzer 202 may determine a tab of another computing device that is part of the same tenant in which client computing device 114A is included to perform code rewriting. For instance, web page analyzer 202 may select a tab identified in rewriter pool 140. Each tab identified in rewriter pool 140 may also be associated with a tenant identifier that identifies the tenant network in which the tab resides and a location identifier that identifies a uniform resource identifier by which requests may be sent to the tab. In accordance with an embodiment, web page analyzer 202 is configured to determine the tabs identified in rewriter pool 140 that belong to the same tenant of tab 120A and randomly select a tab from these determined tabs. In accordance with an embodiment in which rewriter pool 140 is a queue-like structure, web page analyzer 202 utilizes the next tab (belonging to the same tenant) to be dequeued therefrom.

In the example shown in FIG. 2, tab 120B is identified via rewriter pool 140. After identifying tab 120B, web page analyzer 202 identifies code 214 of web page 212 that is to be rewritten. To identify code 214, web page analyzer 202 may extract a plurality of code components from web page 212. Web page analyzer 202 may then organize the plurality of code components extracted into an abstract syntax tree (AST). An AST is a tree representation of the abstract syntactic structure of code (e.g., code 214) written in a programming language. Each node of the AST may denote a construct occurring in the code, and connections between nodes may signify dependencies between such constructs. Web page analyzer 202 may then traverse the AST to identify nodes corresponding to code components (e.g., code 214) that are of interest to proxy service 112 from a management or monitoring perspective and thus targeted for code rewriting.

Code 214 may include code components that implement various actions of interest to proxy service 112 from a monitoring and/or management perspective, such as navigation actions, print actions, file download actions, file upload actions, asynchronous JavaScript and XML (AJAX) actions, and/or any other actions that may be executed by tab 120A of client computing device 114A responsive to displaying web page 212 and/or responsive to a user's interactions therewith.

After identifying code components for rewriting, proxy service 112 may provide the identified code components (e.g., code 214) to tab 120B of client computing device 114, as identified by the location identifier associated with the determined tab of rewriter pool 140, via a request 220. It is noted that in the event that a plurality of code components is identified, proxy service 112 may distribute the rewriting of such components amount a plurality of different tabs opened via a plurality of different client computing devices (e.g., client computing devices 114A-114N, as shown in FIG. 1).

Responsive to receiving request 220, code rewriter 138B rewrites code 214. For example, code rewriter 138B may comprise a code rewriting function that rewrites code 214 in various ways. For example, the code rewriting function may add or remove suffixes to URLs in code 214, insert replacement functions (e.g., "hooks") into code 214 that handle function calls, events, or messages, and/or otherwise modify code 214 to activate or deactivate certain functionality (e.g., upload functionality, download functionality, print functionality, etc.) offered via web page 212 that is in accordance (or not in accordance with) with an access policy utilized by proxy computing device 110. Code rewriter 138B provides the modified code component (shown as code 214') to proxy service 112 via a response 222. Responsive to receive response 222, proxy service 112 provides web page 212, including the modified code component (e.g., code 214') to tab 120A via response 224, which renders web page 212 and executes code 214' (instead of code 214).

In response to determining that web page 212 is privately accessible, web page analyzer 202 may provide code 214 to local rewriter 204 to perform code rewriting in a similar manner as described above with reference to code rewriter 138B, and code rewriter 138B provides the modified code component to proxy service 112 (e.g., response 224).

The manner in which an identified code component is rewritten may depend on an assigned source type thereof. For instance, web page analyzer 202 may be configured to assign a source type to an identified code component based on where the identified code component appears within a structured representation of web page 212. For example, web page analyzer 202 may assign to the identified code component one of a URL-specifying attribute source type, an event attribute source type, or a script element source type depending on where the identified code component appears within a structured representation (e.g., an HTML representation) of web page 212.

In further accordance with this embodiment, web page analyzer 202 may assign a URL-specifying attribute source type to the identified code component in response to determining that the identified code component is included in a value of an attribute that is associated with an element of web page 212 and that specifies a URL. For example, web page analyzer 202 analyzes the following code:

<a href="JS-CODE"></a>;

In this example, web page analyzer 202 identifies "JS-CODE" as the identified code component and assigns a URL-specifying attribute source type to "JS-CODE" because "JS-CODE" is included in the value of the href attribute that is associated with the <a> element of web page 212.

In further accordance with this embodiment, web page analyzer 202 may assign an event attribute source type to the identified code component in response to determining that the identified code component is included in a value of an event attribute that is associated with an element of web page 212. For example, web page analyzer 202 may analyze the following code:

<button onclick="JS-CODE"></button>;

In this example, web page analyzer 202 identifies "JS-CODE" as the identified code component and assigns an event attribute source type to "JS-CODE" because "JS-CODE" is included in the value of the onclick event attribute associated with the <button> element of web page 212.

In still further accordance with this embodiment, web page analyzer 202 may assign a script element source type to the identified code component in response to determining that the identified code component is included in a script element of web page 212. For example, web page analyzer 202 may analyze the following code:

<script>JS-CODE</script>;

In this example, web page analyzer 202 identifies "JS-CODE" as the identified code component and assigns a script element source type to "JS-CODE" because "JS-CODE" is included in the <script> element of web page 208.

In accordance with an example embodiment, code rewriter 138B and local rewriter 206 may operate in accordance with Example Code Rewriting Function ("CR Function" herein) shown herein below:

Example Code Rewriting Function

```
1:  switch (scriptSource){
2:      case 'JS_INLINER':
3:          return Function(RewriteCodeFunction(IdentifiedCode));
4:      case 'JS_ATTR':
5:          var withBlocks = 'with(document){with(this.form || { })
                {with(this) { ' + RewriteCodeFunction(IdentifiedCode) +
                ' }}}';
6:          return Function("event", withBlocks);
7:      case 'SCRIPT_TAG':
8:          const wrappedCode = RewriteCodeFunction(IdentifiedCode);
9:          const newScript = document.createElement('script');
10:         const currentScript = document.currentScript;
11:         newScript.text = wrappedCode;
12:         const attributes = Array.from(currentScript. attributes);
13:         for (const attribute of currentScript.attributes) {
14:             newScript.setAttribute(attribute.name, attribute.value);
15:         }
16:         currentScript.before(newScript);
17:         const elementToRemove = currentScript.isConnected ?
                currentScript : newScript;
18:         elementToRemove.remove( );
19:         break;
20: }
```

As shown above, CR Function may receive the identified code component "IdentifiedCode" and "source" as input arguments, where IdentifiedCode is the identified code component (e.g., code 214) and "source" is the assigned source type for the identified code component. A "switch" statement selects one of the "case" code blocks to evaluate (lines 1, 2, 4, and 7 of CR Function).

If the source is a URL-specifying attribute source type ('JS_INLINER'), a function "Function" is constructed to evaluate a call to a code rewriting function "RewriteCodeFunction( )" (line 3 of CR Function). The call to RewriteCodeFunction passes IdentifiedCode to the code rewriting function to rewrite IdentifiedCode, as described elsewhere herein.

If the source is an event attribute source type ('JS_ATTR'), the rewritten code is evaluated in accordance with lines 4-6 of CR Function. For example, a scope chain for the evaluation of Function is extended to at least include a scope of the element with which the event attribute is associated and a scope of a document object of web page 212. In another example, a scope chain for the evaluation of Function is extended to include the scope of the element with which the event attribute is associated, the scope of a form element that is the parent of the element with which the event attribute is associated, and the scope of the document object of modified web page 212. For instance, in line 5 of CR Function, the variable "withBlocks" is declared. withBlocks includes a call to RewriteCodeComponent( ) that passes IdentifiedCode thereto and nested with statements to extend the scope chain for the evaluation of Function to include the scope of an element "this" with which the event attribute is associated, the scope of a form element "form" that is the parent of element "this", and the scope of the document object "document".

If the source is a script element source type ('SCRIPT_TAG'), the rewritten code is evaluated in accordance with lines 7-19 of CR Function. For instance, in line 8 of CR Function, a constant "wrappedCode" is set to a returned value of a call to RewriteCodeFunction( ). A new script element "newScript" is created (line 9 of CR Function). The text of newScript is set to the rewritten code component (line 11 of CRE Function). In line 16 of CR Function, newScript is appended after currentScript, such that the rewritten code component will be evaluated by tab 120A that displays web page 212 with modified code 214'. Line 17 of CR Function includes a conditional operator that assigns a value of a constant "elementToRemove" based on determining if currentScript is attached to a document of web page 212. Responsive to determining that currentScript is attached to the document object of web page 212, an element.remove( ) method removes currentScript (line 18 of CR Function). Otherwise, the element.remove( ) method removes newScript (line 18 of CR Function).

Figure 3:
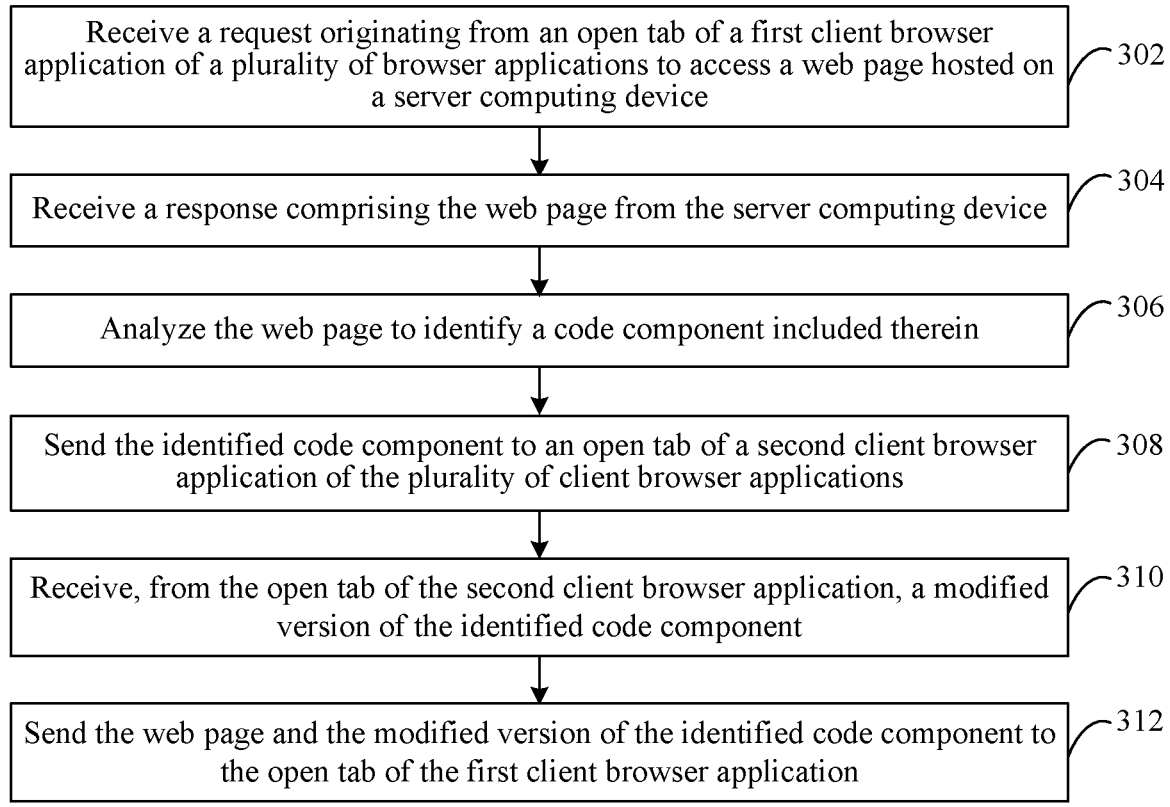
FIG. 3 depicts a flowchart of a method for modifying a code component by a client computing device that is to be executed by another client computing device in accordance with an example embodiment.

Accordingly, a code component of a web page may be modified in many ways. For example, FIG. 3 depicts a flowchart 300 of a method for modifying a code component by a client computing device that is to be executed by another client computing device in accordance with an example embodiment. In an embodiment, flowchart 300 may be implemented by proxy computing device 110, as described in FIG. 2. Accordingly, flowchart 300 will be described with continued reference FIG. 2. Other structural and operational embodiments will be apparent to persons skilled in the relevant art(s) based on the following discussion regarding flowchart 300 and system 200.

Flowchart 300 begins at step 302. In step 302, a request, originating from an open tab of a first client browser application of a plurality of browser applications, to access a web page hosted on a server computing device is received. For instance, with reference to FIG. 2, proxy service 112 of proxy computing device 110 receives request 206 from tab 120A of browser 116A executing on client computing device 114A to access web page 212 hosted by web server 106 of server computing device 104.

In step 304, a response comprising the web page is received from the server computing device. For example, with reference to FIG. 2, proxy service 112 receives response 210 from web server 106 of server computing device 104 comprising web page 212.

In step 306, the web page is analyzed to identify a code component included therein. For instance, web page analyzer 202 may analyze code 214 of web page 212 to identify a code component included therein. For example, with reference to FIG. 2, web analyzer 202 of proxy service 112 analyzes web page 212 to identify code 214 included therein. Additional details regarding analyzing a web page to identify a code component included therein is described below with reference to FIG. 5.

In accordance with one or more embodiments, analyzing the web page to identify the code component comprises analyzing the web page to identify a code component that implements one of a navigation action, a print action, a file download action, or a file upload action. For example, with reference to FIG. 2, code 214 is configured to implement one of a navigation action, a print action, a file download action, or a file upload action.

In step 308, the identified code component is sent to an open tab of a second client browser application of the plurality of client browser applications. For example, with reference to FIG. 2, proxy service 112 sends code 214 to tab 120B of browser 116B executing on client computing device 114B via request 220. Additional details regarding sending identified code components to an open tab of a second client browser application a is described below with reference to FIG. 4.

In accordance with one or more embodiments, the identified code component comprises a JavaScript code component. For example, with reference to FIG. 2, code 214 is a JavaScript code component.

In step 310, a modified version of the identified code component is received from the open tab of the second client browser application. For example, with reference to FIG. 2, code rewriter 138B modifies (e.g., rewrites) code 214 to generate code 214' and provides response 222 comprising code 214' to proxy service 112. Proxy service 112 receives code 214' from tab 120B via response 222.

In step 312, the web page and the modified version of the identified code component is sent to the open tab of the first client browser application. For example, with reference to FIG. 2, proxy service 112 provides web page 212 and code 214' to tab 120A of browser 116A executing on client computing device 114A via response 224.

In accordance with one or more embodiments, the first client browser application and the second client browser application are associated with a same tenant of a cloud services platform. For example, with reference to FIG. 2, browser 116A and browser 116B are associated with a same tenant of a cloud services platform (e.g., cloud services platform 102, as shown in FIG. 1.)

Figure 4:
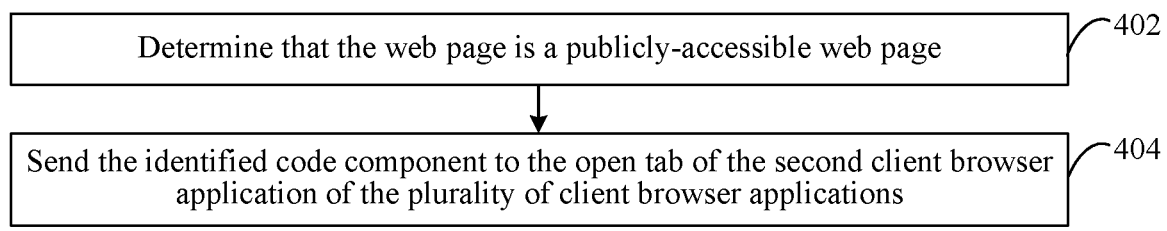
FIG. 4 depicts a flowchart of a method for determining an open tab of another client browser application for sending an identified code component in accordance with an example embodiment.

FIG. 4 depicts a flowchart 400 of a method for determining an open tab of another client browser application for sending an identified code component in accordance with an example embodiment. In an embodiment, flowchart 400 may be implemented by proxy computing device 110, as described in FIG. 2. Accordingly, flowchart 400 will be described with continued reference FIG. 2. Other structural and operational embodiments will be apparent to persons skilled in the relevant art(s) based on the following discussion regarding flowchart 400 and system 200.

Flowchart 400 begins at step 402. In step 402, a determination is made that the web page is a publicly-accessible web page. For example, with reference to FIG. 2, web page analyzer 202 determines that the web page is a publicly-accessible web page.

In accordance with one or more embodiments, determining that the web page is a publicly-accessible web page comprises determining that a cache control field of the response comprises a directive that specifies that the web page is a publicly-accessible web page. For example, with reference to FIG. 2, web page analyzer 202 analyzes a cache control field of response 210 to determine whether it comprises a directive (e.g., "Cache-Control: public") that specifies that web page 212 is a publicly-accessible web page.

In step 404, responsive to the determination that the web page is a publicly-accessible web page, the identified code component is sent to open tab of the second client browser application of the plurality of client browser applications. For example, with reference to FIG. 2, responsive to determining that web page 212 is a publicly-accessible web page, web page analyzer 202 accesses rewriter pool 140 to determine an available open tab of another client browser application (i.e., a client browser application other than browser 116A from which request 206 was provided) to which code 214 may be provided for rewriting. In the example shown in FIG. 2, web page analyzer 202 determines that tab 120B of browser 116B is available, and thus, provides request 220 comprising code 214 to tab 120B, where code rewriter 138B executing therein modifies code 214 to generate code 214'.

It is noted that in the event that web page analyzer 202 determines that web page 212 is not publicly accessible, web page analyzer 202 provides code 214 to local rewriter 204 rather than code rewriter 138B.

Figure 5:
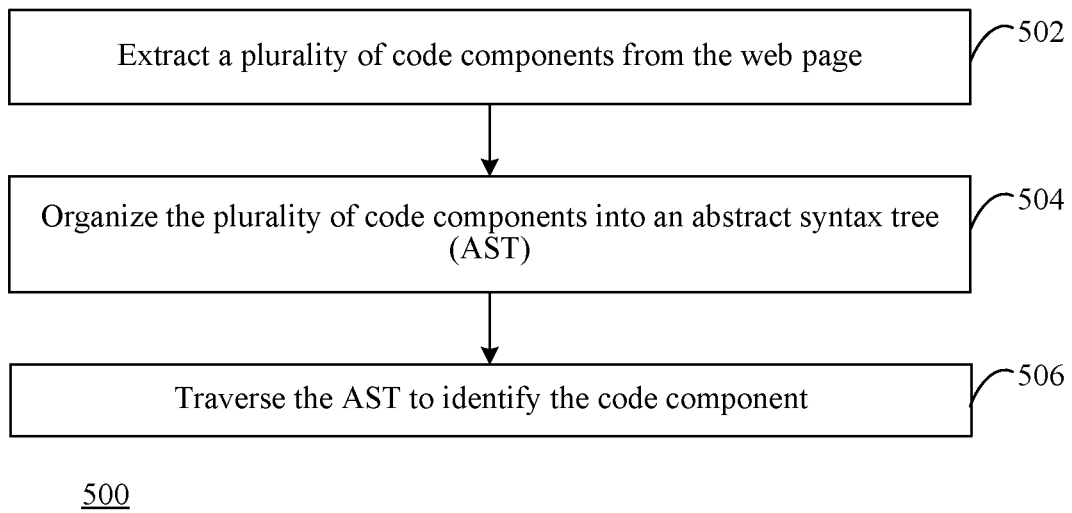
FIG. 5 depicts a flowchart of a method for identifying a code component for modification in accordance with an example embodiment.

FIG. 5 depicts a flowchart 500 of a method for identifying a code component for modification in accordance with an example embodiment. In an embodiment, flowchart 500 may be implemented by proxy computing device 110, as described in FIG. 2. Accordingly, flowchart 500 will be described with continued reference FIG. 2. Other structural and operational embodiments will be apparent to persons skilled in the relevant art(s) based on the following discussion regarding flowchart 500 and system 200.

Flowchart 500 begins at step 502. In step 502, a plurality of code components is extracted from the web page. For example, with reference to FIG. 2, web page analyzer 202 may be configured to extract a plurality of code components from code 214 of web page 212.

In step 504, the plurality of code components is organized into an abstract syntax tree (AST). For example, with reference to FIG. 2, web page analyzer 202 may be configured to organize the plurality of code components extracted in step 502 into an AST. An AST is a tree representation of the abstract syntactic structure of code (e.g., code 214) written in a programming language. Each node of the AST may denote a construct occurring in the code, and connections between nodes may signify dependencies between such constructs.

In step 506, the AST is traversed to identify the code component. For example, with reference to FIG. 2, web page analyzer 202 of FIG. 2 may be configured to traverse the AST organized in step 404 to identify nodes that are of interest to proxy service 112 from a management or monitoring perspective and thus targeted for replacement with wrapped code components.

III. Further Example Embodiments and Advantages

As noted above, systems and devices may be configured in various ways for enabling rewriting of code components on a client computing device. Example embodiments have been described with respect to proxy services that manage communications between web servers and web browsers, however, it is also contemplated herein that a proxy server may manage communications between an application server of an application and a front-end component of the application. For example, the application may be of any type of network accessible application/service, such as a database application, a social networking application, a messaging application, a financial services application, a news application, a search application, a web-accessible productivity application, a cloud storage/file hosting application, or the like. In accordance with such embodiments, a computing process or thread of such applications that performs the rewriting of code components may be referred herein as a worker process.

In accordance with an embodiment, a proxy service is configured to send multiple requests for rewriting to different worker processes. The worker process that returns a response with the rewritten code component(s) first may be utilized for forwarding to the requesting client computing device. Alternatively, the proxy service may be configured to utilize a blockchain-based approach to compare whether rewritten code component(s) returned from at least two worker processes match. Such a technique may be utilized to verify whether the rewritten code component(s) were rewritten correctly (e.g., if more than worker process generated the same rewritten code component(s), then it may be assumed that the code component(s) were rewritten properly).

Figure 6:
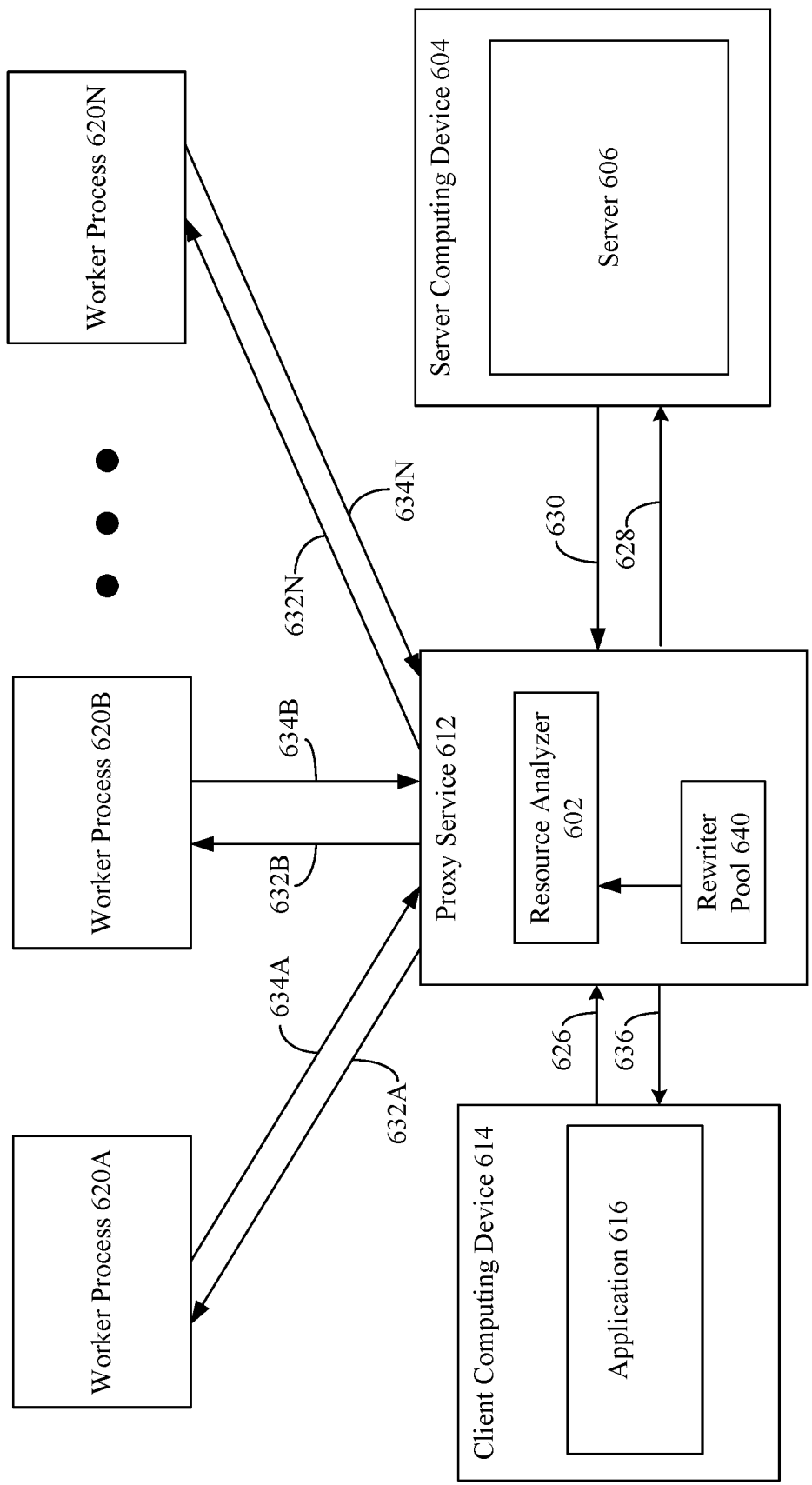
FIG. 6 is a block diagram of an example system for providing requests to rewrite a code component to multiple worker processes in accordance with an embodiment.

For example, FIG. 6 is a block diagram of an example system for providing requests to rewrite a code component to multiple worker processes in accordance with an embodiment. As shown in FIG. 6, system 600 includes a client computing device 614, a plurality of worker processes 620A-620N (executing on respective computing devices), a proxy service 612, and a server computing device 604.

Client computing device 614 is an example of client computing device 114, each of worker processes 620A-620N is an example of tabs(s) 120A-120N, proxy service 612 is an example of proxy service 112, and server computing device 604 is an example of server computing device 104, as respectively described above with respect to FIG. 1. As further shown in FIG. 6, proxy server 612 comprises a resource analyzer 602 and a rewriter pool 640, and server computing device 604 comprises a server 606. Resource analyzer 602 is an example of web page analyzer 202, rewriter pool 640 is an example of rewriter pool 240, and server 606 is an example of web server 606, as respectively described above with reference to FIG. 2.

Proxy service 612 may be configured to receive a request 626 from application 616 for an application or service hosted via server 606. Request 626 is an example of request 206, as described above with reference to FIG. 2. Proxy service 612 may issue a corresponding request 628 to server 606, requesting that server 606 fulfill request 626. Request 628 is an example of request 208, as described above with reference to FIG. 2. Proxy service 612 then receives a response 630 corresponding to request 628 from server 606 that includes a resource. Response 630 is an example of response 210, as described above with reference to FIG. 2.

After receiving response 630, resource analyzer 602 may determine at least two worker processes of other computing devices that are part of the same tenant in which client computing device 614 is included to perform code rewriting. For instance, resource analyzer 602 may select at least two worker processes identified in rewriter pool 640. In the example shown in FIG. 6, worker processes 620A-620N are identified via rewriter pool 640. Resource analyzer 602 also identifies code component(s) of the resource that is to be rewritten and provides the identified code component(s) to each of worker processes 620A-620N via respective requests 632A-632N.

Each of worker processes 620A-620N may rewrite the code component(s) included in respective requests 632A-632N and provide the rewritten code component(s) to proxy service 612 via respective responses 634A-634N. As described above, proxy service 612 may return the rewritten code component(s) received first to application 616. For example, if response 634A is received first, the rewritten code component(s) included therein are provided to application 616, for example, via a response 636 (which is an example of response 224, as described above with reference to FIG. 2). Alternatively, proxy service 612 may be configured to analyze the rewritten code component(s) received from at least two worker processes and determine whether they match. For example, with reference to FIG. 6, resource analyzer 602 may compare the rewritten code component(s) received via responses 634A-634N to determine whether they match. For instance, resource analyzer 602 may determine checksums of the rewritten code component(s) received via responses 634A-634N and compare the checksums to determine whether they are equal (although it is noted that other techniques may be utilized). If the rewritten code component(s) match, then resource analyzer 602 determines that the rewritten code component(s) are valid and provides the rewritten code component(s) (provided from any one of responses 632A-632N) to application 616, for example, via response 636.

In the event that the rewritten code component(s) received via responses 634A-634N do not match, proxy service 612 may not return the rewritten code component(s) and/or provide an error message to application 616. In the event that the rewritten code component(s) received via a subset of responses of responses 634A-634N match (e.g., the rewritten code component(s) included in responses 634A and 634B match, but the rewritten code component(s) included in response 634N do not match the component(s) included in responses 634A and 634B), resource analyzer 602 may provide the rewritten code component(s) included in any of responses 634A and 634B to application 616, for example, via response 636. The assumption here is that worker processes 620A and 620B rewrote the code component(s) correctly, but worker process 620B did not. Alternatively, if any one of responses 634A-634N include rewritten code component(s) that do not match component(s) included in another one of responses 634A-634N, then proxy service 612 may not return the rewritten code component(s) and/or provide an error message to application 616

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Mobile Device and Computer System Implementation

System 100 (and the components thereof) and system 200 (and the components thereof), and/or flowcharts 300, 400 and/or 500 may be implemented in hardware, or hardware combined with software and/or firmware. For example, web server 106, identity provider 108, proxy service 112, rewriter pool 140, browsers 116A-116N, code rewriters 138A-138N, web page analyzer 202, local rewriter 204, client computing device 614, application 616, proxy service 612, resource analyzer 602, rewriter pool 640, server computing device 604, server 606, and worker processes 620A-620N, and/or flowcharts 300, 400, and/or 500 may be implemented as computer program code/instructions configured to be executed in one or more processors and stored in a computer readable storage medium. Alternatively, various components of cloud services platform 102, server computing device 104, web server 106, identity provider 108, proxy computing device 110, proxy server 112, rewriter pool 140, client computing devices 114A-114N, browser 116A-116N, code rewriters 138A-138N, web page analyzer 202, local rewriter 204, client computing device 614, application 616, proxy service 612, resource analyzer 602, rewriter pool 640, server computing device 604, server 606, and worker processes 620A-620N, and/or flowcharts 300, 400, and/or 500 may be implemented as hardware logic/electrical circuitry.

For instance, in an embodiment, one or more, in any combination, of proxy computing device 110, proxy service 112, web page analyzer 202, rewriter pool 140, local rewriter 204, and/or identity provider 108 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
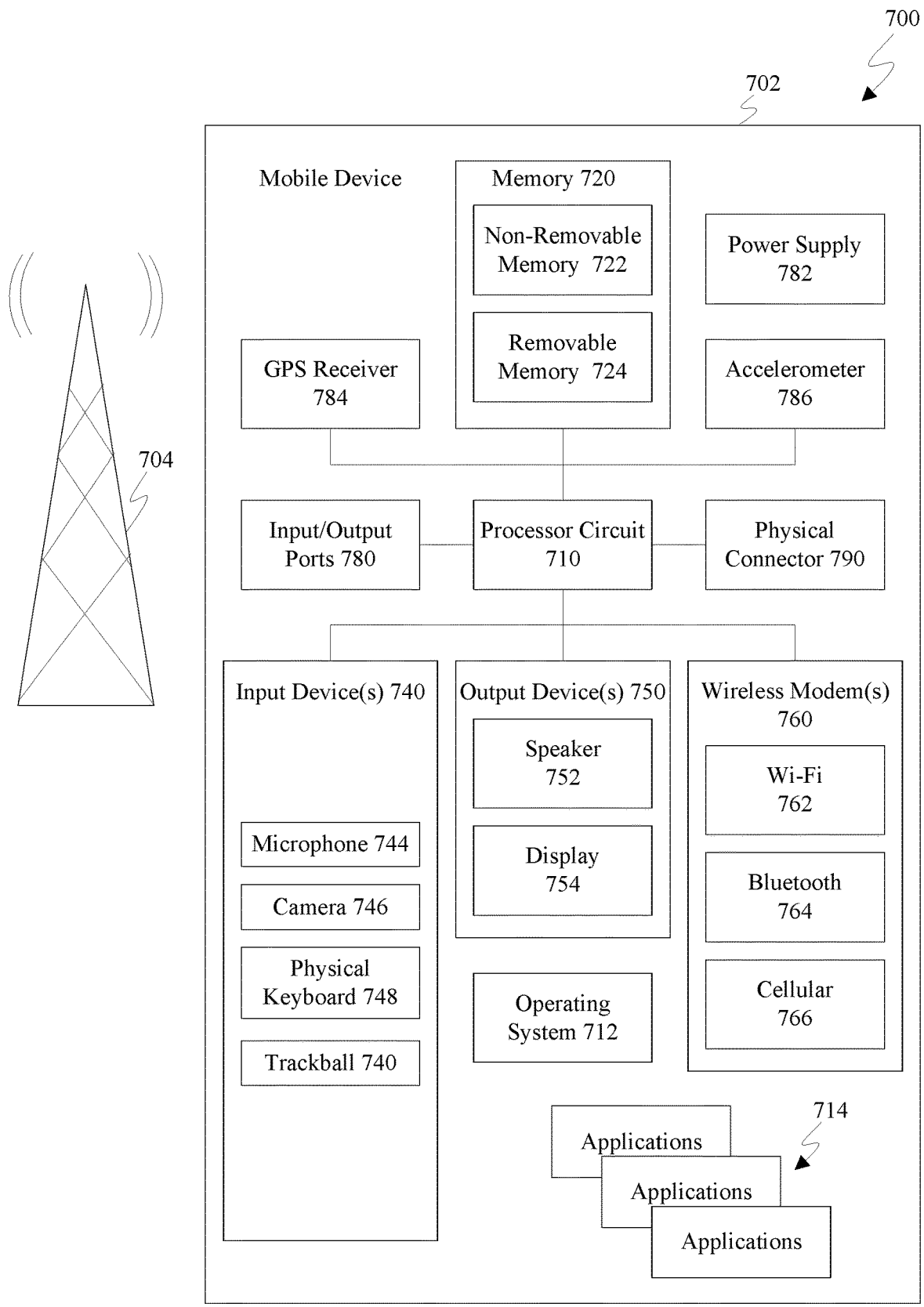
FIG. 7 shows a block diagram of an example mobile device that may be used to implement various example embodiments.

FIG. 7 is a block diagram of an exemplary mobile system 700 that includes a mobile device 702 that may implement embodiments described herein (e.g., client computing devices 114A-114N, server computing device 104, proxy computing device 110, client computing device 614, proxy service 612, server computing device 604, and/or worker processes 620A-620N). For example, mobile device 702 may be used to implement any system, client, or device, or components/subcomponents thereof, in the preceding sections. As shown in FIG. 7, mobile device 702 includes a variety of optional hardware and software components. Any component in mobile device 702 can communicate with any other component, although not all connections are shown for ease of illustration. Mobile device 702 can be any of a variety of computing devices (e.g., cell phone, smart phone, handheld computer, Personal Digital Assistant (PDA), etc.) and can allow wireless two-way communications with one or more mobile communications networks 704, such as a cellular or satellite network, or with a local area or wide area network.

Mobile device 702 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components of mobile device 702 and provide support for one or more application programs 714 (also referred to as "applications" or "apps"). Application programs 714 may include common mobile computing applications (e.g., e-mail applications, calendars, contact managers, web browsers, messaging applications) and any other computing applications (e.g., word processing applications, mapping applications, media player applications).

Mobile device 702 can include memory 720. Memory 720 can include non-removable memory 722 and/or removable memory 724. Non-removable memory 722 can include RAM, ROM, flash memory, a hard disk, or other well-known memory devices or technologies. Removable memory 724 can include flash memory or a Subscriber Identity Module (SIM) card, which is well known in GSM communication systems, or other well-known memory devices or technologies, such as "smart cards." Memory 720 can be used for storing data and/or code for running operating system 712 and application programs 714. Example data can include web pages, text, images, sound files, video data, or other data to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing one or more of web server 106, identity provider 108, proxy service 112, rewriter pool 140, browsers 116A-116N, code rewriters 138A-138N, web page analyzer 202, local rewriter 204, application 616, proxy service 612, resource analyzer 602, rewriter pool 640, server 606, and/or worker processes 620A-620N along with any components and/or subcomponents thereof, as well as the flowcharts/flow diagrams described herein, including portions thereof, and/or further examples described herein.

Mobile device 702 can support one or more input devices 730, such as a touch screen 732, a microphone 734, a camera 736, a physical keyboard 738 and/or a trackball 740 and one or more output devices 750, such as a speaker 752 and a display 754. Other possible output devices (not shown) can include piezoelectric or other haptic output devices. Some devices can serve more than one input/output function. For example, touch screen 732 and display 754 can be combined in a single input/output device. Input devices 730 can include a Natural User Interface (NUI).

One or more wireless modems 760 can be coupled to antenna(s) (not shown) and can support two-way communications between processor 710 and external devices, as is well understood in the art. Modem 760 is shown generically and can include a cellular modem 766 for communicating with the mobile communication network 704 and/or other radio-based modems (e.g., Bluetooth 764 and/or Wi-Fi 762). At least one wireless modem 760 is typically configured for communication with one or more cellular networks, such as a GSM network for data and voice communications within a single cellular network, between cellular networks, or between the mobile device and a public switched telephone network (PSTN).

Mobile device 702 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components of mobile device 702 are not required or all-inclusive, as any components can be deleted and other components can be added as would be recognized by one skilled in the art.

In an embodiment, mobile device 702 is configured to implement any of the above-described features of flowcharts herein. Computer program logic for performing any of the operations, steps, and/or functions described herein may be stored in memory 720 and executed by processor 710.

Figure 8:
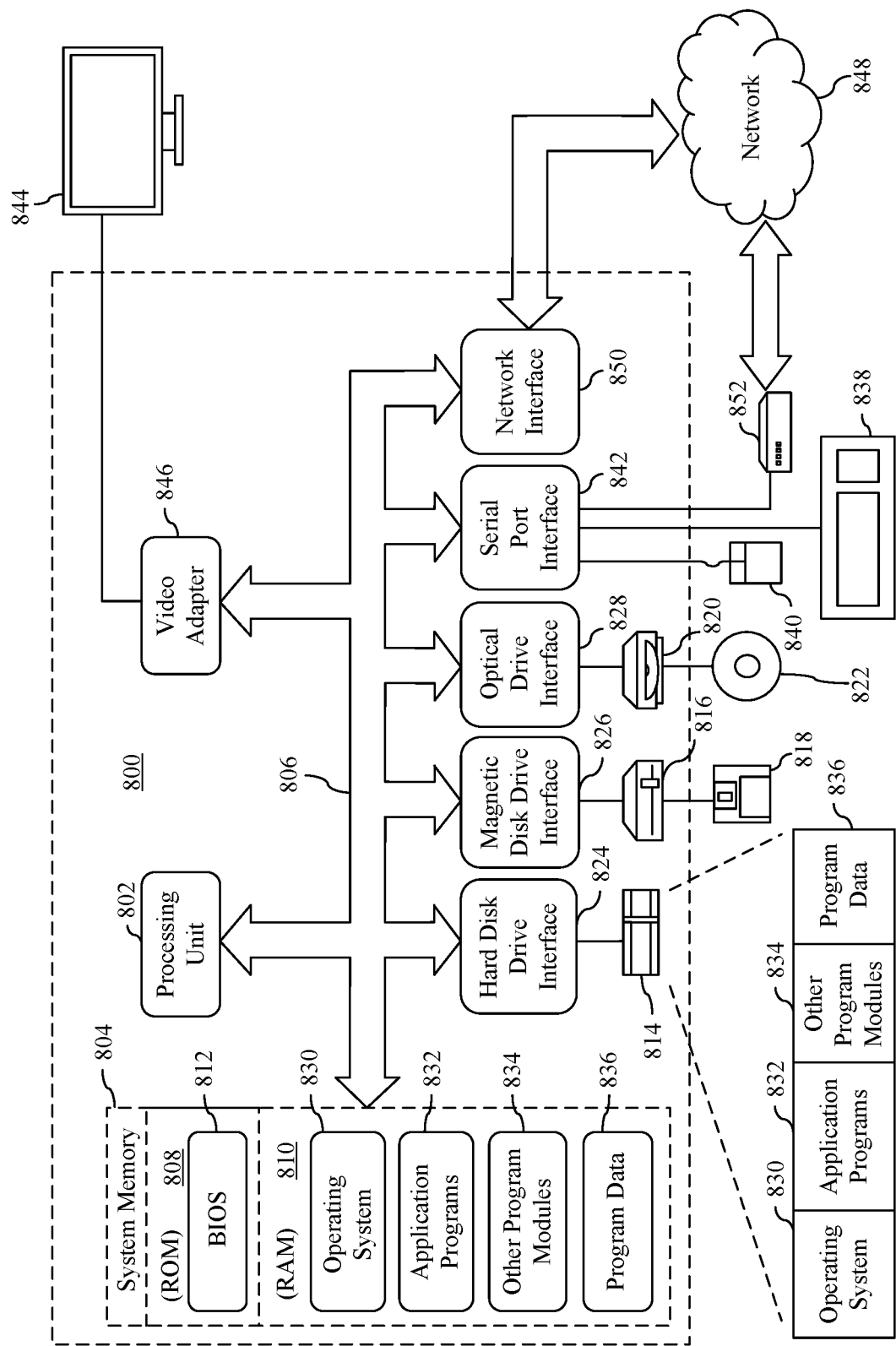
FIG. 8 shows a block diagram of an example computer system in which embodiments may be implemented.

FIG. 8 depicts an exemplary implementation of a computing device 800 in which embodiments may be implemented. For example, cloud services platform 102, server computing device 104, web server 106, identity provider 108, proxy computing device 110, proxy server 112, rewriter pool 140, client computing devices 114A-114N, browser 116A-116N, code rewriters 138A-138N, web page analyzer 202, local rewriter 204, client computing device 614, application 616, proxy service 612, resource analyzer 602, rewriter pool 640, server computing device 604, server 606, and worker processes 620A-620N may each be implemented in one or more computing devices similar to computing device 800 in stationary or mobile computer embodiments, including one or more features of computing device 800 and/or alternative features. The description of computing device 800 provided herein is provided for purposes of illustration and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing web server 106, identity provider 108, proxy service 112, rewriter pool 140, browsers 116A-116N, code rewriters 138A-138N, web page analyzer 202, and local rewriter 204 (and the various components thereof) and flowcharts 300, 400, and/or 500 (including any suitable step of flowcharts 300, 400 and/or 500), and/or further embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments described herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Exemplary Embodiments

A proxy computing device communicatively coupled to a plurality of client browser applications and a server computing device is described herein. The proxy computing device comprises at least one processor circuit; and at least one memory that stores program code configured to be executed by the at least one processor circuit, the program code configured to, when executed by the at least one processor circuit, cause the proxy computing device to: receive a request, originating from an open tab of a first client browser application of the plurality of client browser applications, to access a web page hosted on the server computing device; receive a response comprising the web page from the server computing device; analyze the web page to identify a code component therein; send the identified code component to an open tab of a second client browser application of the plurality of client browser applications; receive, from the open tab of the second client browser application, a modified version of the identified code component; and send the web page and the modified version of the identified code component to the open tab of the first client browser application.

In one implementation of the proxy computing device, the first client browser application and the second client browser application are associated with a same tenant of a cloud services platform.

In one implementation of the proxy computing device, the program code, when executed by the at least one processor circuit, is configured to cause the proxy computing device to send the identified code component to the open tab of the second client browser application of the plurality of client browser applications by: determining that the web page is a publicly-accessible web page; and responsive to determining that the web page is a publicly-accessible web page, sending the identified code component to the open tab of the second client browser application of the plurality of client browser applications.

In one implementation of the proxy computing device, the program code, when executed by the at least one processor circuit is configured to cause the proxy computing device to determine that the web page is a publicly-accessible web page by: determining that a cache control field of the response comprises a directive that specifies that the web page is a publicly-accessible web page.

In one implementation of the proxy computing device, the program code, when executed by the at least one processor circuit is configured to cause the proxy computing device to analyze the web page to identify a code component therein by: extracting a plurality of code components from the web page; organizing the plurality of code components into an abstract syntax tree (AST); and traversing the AST to identify the code component.

In one implementation of the proxy computing device, the program code, when executed by the at least one processor circuit is configured to cause the proxy computing device to analyze the web page to identify a code component therein by: analyzing the web page to identify a code component that implements one of: a navigation action; a print action; a file download action; or a file upload action.

In one implementation of the proxy computing device, the identified code component comprises a JavaScript code component.

A method performed by a proxy computing device that is communicatively coupled to a plurality of client browser applications and a server computing device is also described herein. The method includes: receiving a request, originating from an open tab of a first client browser application of the plurality of client browser applications, to access a web page hosted on the server computing device; receiving a response comprising the web page from the server computing device; analyzing the web page to identify a code component therein; sending the identified code component to an open tab of a second client browser application of the plurality of client browser applications; receiving, from the open tab of the second client browser application, a modified version of the identified code component; and sending the web page and the modified version of the identified code component to the open tab of the first client browser application.

In one implementation of the method, the first client browser application and the second client browser application are associated with a same tenant of a cloud services platform.

In one implementation of the method, said sending the identified code component to the open tab of the second client browser application of the plurality of client browser applications comprises: determining that the web page is a publicly-accessible web page; and responsive to determining that the web page is a publicly-accessible web page, sending the identified code component to the open tab of the second client browser application of the plurality of client browser applications.

In one implementation of the method, said determining that the web page is a publicly-accessible web page comprises: determining that a cache control field of the response comprises a directive that specifies that the web page is a publicly-accessible web page.

In one implementation of the method, said analyzing the web page to identify the code component comprises: extracting a plurality of code components from the web page; organizing the plurality of code components into an abstract syntax tree (AST); and traversing the AST to identify the code component.

In one implementation of the method, said analyzing the web page to identify the code component comprises analyzing the web page to identify a code component that implements one of: a navigation action; a print action; a file download action; or a file upload action.

In one implementation of the method, the identified code component comprises a JavaScript code component.

A computer-readable storage medium having program instructions recorded thereon that, when executed by at least one processor of a proxy computing device communicatively coupled to a plurality of worker processes and a server computing device, perform a method comprising: receiving a request, originating from an application, to access a resource hosted on the server computing device; receiving a response comprising the resource from the server computing device; analyzing the resource to identify a code component therein; sending the identified code component to a worker process of the plurality of worker processes; receiving, from the worker process, a modified version of the identified code component; and sending the resource and the modified version of the identified code component to the application.

In one implementation of the computer-readable storage medium, wherein the application and the worker process are associated with a same tenant of a cloud services platform.

In one implementation of the computer-readable storage medium, said sending the identified code component to the worker process of the plurality of worker processes comprises: determining that resource is a publicly-accessible resource; and responsive to determining that the resource is a publicly-accessible resource, sending the identified code component to the worker process of the plurality of worker processes.

In one implementation of the computer-readable storage medium, said sending the identified code component to the worker process of the plurality of worker processes comprises sending the identified code component to at least two worker processes of the plurality of worker processes; receiving, from the worker process, the modified version of the identified code component comprises receiving, from the at least two worker processes, a respective modified version of the identified component; and sending the resource and the modified version of the identified code component to the application comprises: determining that the respective modified versions of the identified component are the same; and responsive to determining that the respective modified versions of the identified component are the same, sending the resource and one of the respective modified versions of the identified component to the application.

In one implementation of the computer-readable storage medium, said analyzing the web page to identify the code component comprises: extracting a plurality of code components from the resource; organizing the plurality of code components into an abstract syntax tree (AST); and traversing the AST to identify the code component.

In one implementation of the computer-readable storage medium, said analyzing the resource to identify the code component comprises analyzing the resource to identify a code component that implements one of: a navigation action; a print action; a file download action; or a file upload action.

VI. CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A proxy computing device communicatively coupled to a plurality of client browser applications and a server computing device, comprising:
at least one processor circuit; and
at least one memory that stores program code configured to be executed by the at least one processor circuit, the program code configured to, when executed by the at least one processor circuit, cause the proxy computing device to:
receive a request, originating from an open tab of a first client browser application of the plurality of client browser applications, to access a web page hosted on the server computing device;
receive a response comprising the web page from the server computing device;
analyze the web page to identify a code component therein;
send the identified code component to an open tab of a second client browser application of the plurality of client browser applications;
receive, from the open tab of the second client browser application, a modified version of the identified code component; and
send the web page and the modified version of the identified code component to the open tab of the first client browser application.

2. The proxy computing device of claim 1, wherein the first client browser application and the second client browser application are associated with a same tenant of a cloud services platform.

3. The proxy computing device of claim 1, wherein the program code, when executed by the at least one processor circuit, is configured to cause the proxy computing device to send the identified code component to the open tab of the second client browser application of the plurality of client browser applications by:

determining that the web page is a publicly-accessible web page; and
responsive to determining that the web page is a publicly-accessible web page, sending the identified code component to the open tab of the second client browser application of the plurality of client browser applications.

4. The proxy computing device of claim 3, wherein the program code, when executed by the at least one processor circuit is configured to cause the proxy computing device to determine that the web page is a publicly-accessible web page by:
determining that a cache control field of the response comprises a directive that specifies that the web page is a publicly-accessible web page.

5. The proxy computing device of claim 1, wherein the program code, when executed by the at least one processor circuit is configured to cause the proxy computing device to analyze the web page to identify a code component therein by:
extracting a plurality of code components from the web page;
organizing the plurality of code components into an abstract syntax tree (AST); and
traversing the AST to identify the code component.

6. The proxy computing device of claim 1, wherein the program code, when executed by the at least one processor circuit is configured to cause the proxy computing device to analyze the web page to identify a code component therein by:
analyzing the web page to identify a code component that implements one of:
a navigation action;
a print action;
a file download action; or
a file upload action.

7. The proxy computing device of claim 1, wherein the identified code component comprises a JavaScript code component.

8. A method performed by a proxy computing device that is communicatively coupled to a plurality of client browser applications and a server computing device, comprising:
receiving a request, originating from an open tab of a first client browser application of the plurality of client browser applications, to access a web page hosted on the server computing device;
receiving a response comprising the web page from the server computing device;
analyzing the web page to identify a code component therein;
sending the identified code component to an open tab of a second client browser application of the plurality of client browser applications;
receiving, from the open tab of the second client browser application, a modified version of the identified code component; and
sending the web page and the modified version of the identified code component to the open tab of the first client browser application.

9. The method of claim 8, wherein the first client browser application and the second client browser application are associated with a same tenant of a cloud services platform.

10. The method of claim 8, wherein said sending the identified code component to the open tab of the second client browser application of the plurality of client browser applications comprises:

determining that the web page is a publicly-accessible web page; and responsive to determining that the web page is a publicly-accessible web page, sending the identified code component to the open tab of the second client browser application of the plurality of client browser applications.

11. The method of claim 10, wherein said determining that the web page is a publicly-accessible web page comprises:

determining that a cache control field of the response comprises a directive that specifies that the web page is a publicly-accessible web page.

12. The method of claim 8, wherein said analyzing the web page to identify the code component comprises:

extracting a plurality of code components from the web page;

organizing the plurality of code components into an abstract syntax tree (AST); and traversing the AST to identify the code component.

13. The method of claim 8, wherein said analyzing the web page to identify the code component comprises analyzing the web page to identify a code component that implements one of:

a navigation action;
a print action;
a file download action; or
a file upload action.

14. The method of claim 8, wherein the identified code component comprises a JavaScript code component.

15. A computer-readable storage medium having program instructions recorded thereon that, when executed by at least one processor of a proxy computing device communicatively coupled to a plurality of worker processes and a server computing device, perform a method comprising:

receiving a request, originating from an application, to access a resource hosted on the server computing device;

receiving a response comprising the resource from the server computing device;

analyzing the resource to identify a code component therein;

determining that resource is a publicly-accessible resource;

responsive to determining that the resource is a publicly-accessible resource, sending the identified code component to a worker process of the plurality of worker processes;

receiving, from the worker process, a modified version of the identified code component; and sending the resource and the modified version of the identified code component to the application.

16. The computer-readable storage medium of claim 15, wherein the application and the worker process are associated with a same tenant of a cloud services platform.

17. The computer-readable storage medium of claim 15, wherein said sending the identified code component to the worker process of the plurality of worker processes comprises sending the identified code component to at least two worker processes of the plurality of worker processes;

wherein receiving, from the worker process, the modified version of the identified code component comprises receiving, from the at least two worker processes, a respective modified version of the identified component; and wherein sending the resource and the modified version of the identified code component to the application comprises:

determining that the respective modified versions of the identified component are the same; and responsive to determining that the respective modified versions of the identified component are the same, sending the resource and one of the respective modified versions of the identified component to the application.

18. The computer-readable storage medium of claim 15, wherein said analyzing the web page to identify the code component comprises:

extracting a plurality of code components from the resource;

organizing the plurality of code components into an abstract syntax tree (AST); and traversing the AST to identify the code component.

19. The computer-readable storage medium of claim 15, wherein said analyzing the resource to identify the code component comprises analyzing the resource to identify a code component that implements one of:

a navigation action;
a print action;
a file download action; or
a file upload action.

* * * * *